(12) United States Patent
Svensson

(10) Patent No.: US 11,493,650 B2
(45) Date of Patent: Nov. 8, 2022

(54) METHODS FOR DETECTING A POSITION OF AN ENERGY BEAM SPOT AND APPARATUSES FOR PERFORMING THE SAME

(71) Applicant: Arcam AB, Mölnlycke (SE)

(72) Inventor: David Svensson, Gothenburg (SE)

(73) Assignee: Arcam AB, Molnlycke (SE)

( * ) Notice: Subject to any disclaimer, the term of this patent is extended or adjusted under 35 U.S.C. 154(b) by 248 days.

(21) Appl. No.: 16/871,480

(22) Filed: May 11, 2020

(65) Prior Publication Data
US 2021/0349224 A1 Nov. 11, 2021

(51) Int. Cl.
*G01T 1/29* (2006.01)
*B33Y 50/02* (2015.01)
*B22F 10/28* (2021.01)
*B22F 12/90* (2021.01)
*B23K 15/00* (2006.01)

(52) U.S. Cl.
CPC ............. *G01T 1/29* (2013.01); *B22F 10/28* (2021.01); *B22F 12/90* (2021.01); *B23K 15/0013* (2013.01); *B33Y 50/02* (2014.12); *B22F 2999/00* (2013.01)

(58) Field of Classification Search
CPC .. G01T 1/29; B22F 10/28; B22F 12/90; B22F 2999/00; B23K 15/0013
See application file for complete search history.

(56) References Cited

U.S. PATENT DOCUMENTS

| | | | |
|---|---|---|---|
| 6,252,935 B1 | 6/2001 | Styrnol et al. | |
| 6,537,052 B1 | 3/2003 | Adler | |
| 9,721,755 B2 * | 8/2017 | Lock | B33Y 40/00 |
| 2015/0283762 A1 * | 10/2015 | Maeda | B29C 64/153 264/497 |
| 2016/0211119 A1 * | 7/2016 | Lock | B33Y 50/02 |
| 2017/0066051 A1 | 3/2017 | Ackelid et al. | |
| 2017/0087661 A1 * | 3/2017 | Backlund | B29C 64/20 |
| 2017/0294288 A1 | 10/2017 | Lock | |
| 2018/0126670 A1 | 5/2018 | DehghanNiri et al. | |
| 2019/0077086 A1 | 3/2019 | Stengel et al. | |
| 2019/0193193 A1 | 6/2019 | Fager | |
| 2019/0302043 A1 | 10/2019 | Lobastov et al. | |
| 2019/0329498 A1 | 10/2019 | Wasmer et al. | |

* cited by examiner

*Primary Examiner* — David P Porta
*Assistant Examiner* — Jeremy S Valentiner
(74) *Attorney, Agent, or Firm* — Dinsmore & Shohl LLP

(57) ABSTRACT

A method for detecting a position of an energy beam comprises mapping a first density modulated x-ray signal with a plurality of locations on an energy beam target, thereby generating a model of a background x-ray intensity. The method further comprises forming an x-ray signal time series using subsequent intensity modulated x-ray signals, each resulting from scanning the energy beam along the energy beam target in one of a plurality of directions at one of a plurality of speeds, and determining the position of the energy beam based upon a received x-ray signal strength based on the x-ray signal time series and the model of the background x-ray intensity.

19 Claims, 8 Drawing Sheets

METHODS FOR DETECTING A POSITION OF AN ENERGY BEAM SPOT AND APPARATUSES FOR PERFORMING THE SAME

FIELD

This present application relates to electron beam manufacturing apparatuses and, more particularly, to improved methods for determining a location of an electron beam during the operation of such apparatuses.

BACKGROUND

Additive manufacturing is a method for forming three-dimensional articles through successive fusion of portions of powder layers applied to a work plate. Apparatuses for additive manufacturing generally include a work table on which the three-dimensional article is to be formed, a powder dispenser, arranged to lay down a thin layer of powder on the work table for the formation of a powder bed, an energy beam source for delivering an energy beam spot to the powder to fuse the powder, and a controller in which information is stored concerning representations of layers of the three-dimensional article. The three-dimensional article is formed through consecutive fusion of the layers of powder laid down by the powder dispenser.

In order to melt the powder at specific locations corresponding to the representations of the layers of the three-dimensional article, the energy beam must be accurately controlled, including the deflection speed, position, and shape of the energy beam. Although methods exist to calibrate the position of the energy beam with respect to a stationary target, such calibration methods cannot be used while the energy beam is in use and operation of the apparatus assumes that the velocity and position of the energy beam are known. However, the velocity and/or position of the energy beam may deviate over time, such as may result from failure of any one of a number of components within the apparatus. For example, power amplifiers or other components within the additive manufacturing apparatus may fail, thereby generating a dynamic velocity of the energy beam, which may lead to parts that are out of specification.

Accordingly, there exists a need for a method to quantify or track an energy beam during operation of an additive manufacturing apparatus.

SUMMARY

Various embodiments described herein provide a method for detecting a position of an energy beam comprising mapping a first density modulated x-ray signal with a plurality of locations on an energy beam target, thereby generating a model of a background x-ray intensity. The method further comprises forming an x-ray signal time series using subsequent intensity modulated x-ray signals, each resulting from scanning the energy beam along the energy beam target in one of a plurality of directions at one of a plurality of speeds, and determining the position of the energy beam based upon a received x-ray signal strength based on the x-ray signal time series and the model of the background x-ray intensity. Additional features and advantages will be described in greater detail below.

According to a first aspect disclosed herein, a method for detecting a position of an energy beam, the method comprising: mapping, using a computing device, a first intensity modulated x-ray signal with a plurality of locations on an energy beam target, thereby generating a model of a background x-ray intensity; forming, using the computing device, an x-ray signal time series using subsequent intensity modulated x-ray signals, each of the subsequent intensity modulated x-ray signals resulting from scanning an energy beam along the energy beam target in one of a plurality of directions at one of a plurality of speeds; and determining, using the computing device, the position of the energy beam based upon a received x-ray signal strength based on the x-ray signal time series and the model of the background x-ray intensity.

According to a second aspect disclosed herein, a method comprises the method according to the first aspect, wherein each of the x-ray signals is received by an x-ray detector located at a position that is closer to a first edge of the energy beam target than a second edge of the energy beam target opposing the first edge of the energy beam target and closer to a third edge of the energy beam target than a fourth edge of the energy beam target opposing the third edge of the energy beam target, wherein the third edge and the fourth edge extend from the first edge to the second edge of the energy beam target.

According to a third aspect disclosed herein, a method comprises the method according to the first or second aspects, wherein determining the position of the energy beam comprises determining the position of the energy beam along a predetermined axis.

According to a fourth aspect disclosed herein, a method comprises the method according to any one of the previous aspects, wherein determining the position of the energy beam comprises identifying two possible positions of the energy beam along the predetermined axis.

According to a fifth aspect disclosed herein, a method comprises the method according to any one of the previous aspects, wherein the model of the background x-ray intensity is based on a quadratic equation.

According to a sixth aspect disclosed herein, a method comprises the method according to any one of the previous aspects, further comprising: determining, using the computing device, that the position of the energy beam differs from a target position by an amount greater than a threshold amount; and setting a maximum energy beam speed responsive to determining that the position of the energy beam differs from the target position by the amount greater than the threshold amount.

According to a seventh aspect disclosed herein, a method comprises the method according to any one of the previous aspects, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

According to an eighth aspect disclosed herein, a method comprises the method according to any one of the previous aspects, wherein determining the position of the energy beam comprises determining the position of the energy beam along a predetermined axis.

According to a ninth aspect disclosed herein, a method comprises the method according to the eighth aspect, wherein determining the position of the energy beam comprises identifying two possible positions of the energy beam along the predetermined axis.

According to a tenth aspect disclosed herein, a method comprises the method according to any one of the previous aspects, wherein the model of the x-ray background intensity and the x-ray signal time series corresponds to a first x-ray detector, the method further comprising: mapping, using the computing device, the first intensity modulated x-ray signal received by a second x-ray detector with a plurality of locations on an energy beam target, thereby generating a model of a background x-ray intensity corresponding to the second x-ray detector; and forming, using the computing device, an x-ray signal time series corresponding to the second x-ray detector using subsequent intensity modulated x-ray signals received by the second x-ray detector.

According to an eleventh aspect disclosed herein, a method comprises the method according to any one of the previous aspects, wherein determining the position of the energy beam comprises identifying a position of the energy beam in at least two dimensions.

According to a twelfth aspect disclosed herein, a method comprises the method according to any one of the previous aspects, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

According to a thirteenth aspect disclosed herein, a method comprises the method according to any one of the previous aspects, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

According to a fourteenth aspect disclosed herein, a program element configured and arranged when executed on a computer to implement a method for detecting a position of an energy beam, the method comprising the steps of: mapping a first intensity modulated x-ray signal with a plurality of locations on an energy beam target, thereby generating a model of a background x-ray intensity; forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and determining the position of the energy beam based upon a received x-ray signal strength based on the x-ray signal time series and the model of the background x-ray intensity.

According to a fifteenth aspect disclosed herein, a program element comprises the method according to the fourteenth aspect, the method further comprising: determining that the position of the energy beam differs from a target position by an amount greater than a threshold amount; and setting a maximum energy beam speed responsive to determining that the position of the energy beam differs from the target position by the amount greater than the threshold amount.

According to a sixteenth aspect disclosed herein, a program element comprises the method according to any one of the previous aspects, the method further comprising: scanning an energy beam in at least a first direction on the energy beam target for generating x-rays to be received by at least one x-ray detector; receiving the generated x-rays with the at least one x-ray detector; and generating the first intensity modulated x-ray signal based on the generated x-rays received by the at least one x-ray detector.

According to a seventeenth aspect disclosed herein, a computer readable medium having stored thereon the program element according to any one of the preceding aspects.

According to an eighteenth aspect disclosed herein, a non-transitory computer program product comprises at least one computer-readable storage medium having computer-readable program code portions embodied thereon, the computer-readable program code portions comprising: an executable portion configured for mapping a first intensity modulated x-ray signal with a plurality of locations on an energy beam target, thereby generating a model of a background x-ray intensity; an executable portion configured for forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and an executable portion configured for determining the position of the energy beam based upon a received x-ray signal strength based on the x-ray signal time series and the model of the background x-ray intensity.

According to a nineteenth aspect disclosed herein, a non-transitory computer program product comprises the non-transitory computer program product according to the eighteenth aspect, wherein the computer-readable program code portions further comprise: an executable portion configured for determining that the position of the energy beam differs from a target position by an amount greater than a threshold amount; and an executable portion configured for setting a maximum energy beam speed responsive to determining that the position of the energy beam differs from the target position by the amount greater than the threshold amount.

According to a twentieth aspect disclosed herein, a non-transitory computer program product comprises the non-transitory computer program product according to the eighteenth or nineteenth aspects, wherein the computer-readable program code portions further comprise: an executable portion configured for scanning an energy beam in at least a first direction on the energy beam target for generating x-rays to be received by at least one x-ray detector; an executable portion configured for receiving the generated x-rays with the at least one x-ray detector; and an executable portion configured for generating the first intensity modulated x-ray signal based on the generated x-rays received by the at least one x-ray detector.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
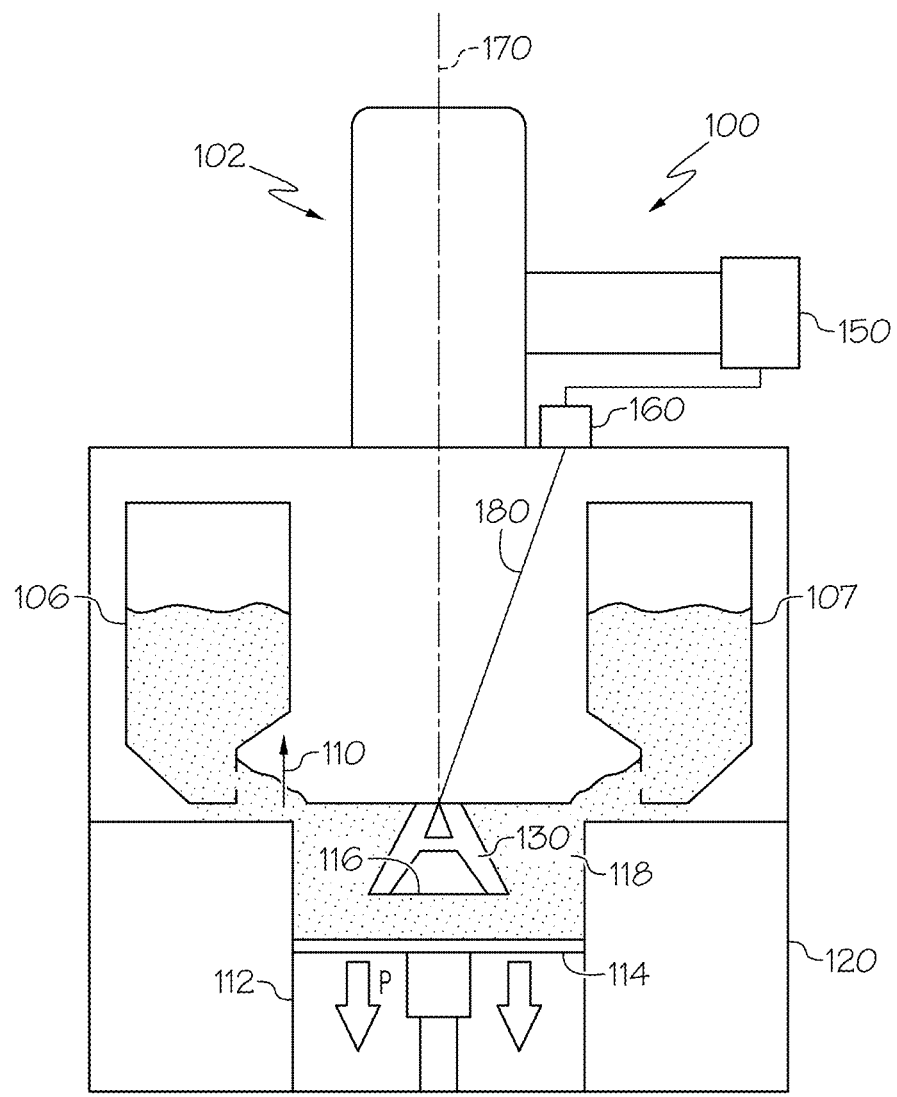
FIG. 1 schematically depicts an additive manufacturing apparatus that can be used to implement the method in accordance with one or more embodiments shown and described herein.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

The terms "three-dimensional structures" and "three-dimensional articles," as used herein, refer generally to intended or actually fabricated three-dimensional configurations that are intended to be used for a particular purpose. Such configurations may, for example, be designed with the aid of a three-dimensional CAD system.

The term "electron beam," as used herein refers to any charged particle beam. The sources of a charged particle beam, referred to herein as an "energy beam source," can include an electron gun, a linear accelerator, or the like.

FIG. 1 depicts an example manufacturing apparatus 100 that can be used to implement one or more embodiments described herein. As shown in FIG. 1, the manufacturing apparatus 100 includes an energy beam source 102, two powder hoppers 106, 107, a work plate 116, a build tank 112, a powder distributer 110, a build platform 114, a vacuum chamber 120, a control unit 150, and at least one x-ray detector 160.

The vacuum chamber 120 is capable of maintaining a vacuum environment using a vacuum system, which may include a turbo molecular pump, a scroll pump, an ion pump, and one or more valves, such as is well known to a person skilled in the art. In various embodiments, the vacuum system is controlled by the control unit 150. In embodiments, the pressure in the vacuum chamber is in the range of from $1\times10^{-3}$ to $1\times10^{-6}$ mBar when building a three-dimensional article 130 by fusing the powder layer by layer with the energy beam.

The energy beam source 102 generates an energy beam 170 which is used for melting or fusing together powder material 118 provided on the work plate 116. The energy beam source 102 may be provided in the vacuum chamber 120. The control unit 150 is used for controlling and managing the energy beam emitted from the energy beam source 102. At least one focusing coil (not shown), at least one deflection coil (not shown), and an energy beam power supply (not shown) may be electrically connected to the control unit 150. In various embodiments, the energy beam source 102 generates a focusable energy beam with an accelerating voltage of about 60 kV and with a beam power in the range of 0-10 kW. In embodiments, the control unit 150 is configured to control the build platform 114, the powder distributer 110 and powder hoppers 106, 107 to provide powder material 118 to provide material for each successive build layer, and to control the energy beam 170, including the power output, the position, the movement, and the scan speed thereof, such that the energy beam 170 follows a predetermined path along each build layer, such that the powder material 118 is selectively fused to form each layer of the three-dimensional article having a fused layer thickness in accordance with the build file, as will be described below.

The powder hoppers 106, 107 include the powder material 118 to be provided on the work plate 116 in the build tank 112. The powder material 118 can, for example, be a metal or metal alloy powder, such as a powder of titanium, titanium alloy, aluminum, aluminum alloy, stainless steel, Co—Cr—W alloy, or the like. Other types of powders known and used in the art are contemplated.

In embodiments, the powder distributor 110 deposits a thin layer of powder material 118 on the work plate 116. During a work cycle, the build platform 114 is lowered successively in relation to the energy beam source 102 after each added layer of powder material 118. Accordingly, the build platform 114 is, in embodiments, moveably in a vertical direction, i.e., in the direction of arrow P in FIG. 1. In use, the build platform 114 starts in an initial position, in which a first powder layer is deposited on the work plate 116. In embodiments, the first powder layer has a thickness that is greater than a thickness of subsequent powder layers to prevent melt-through of the first layer onto the work plate 116. Following deposition of the first layer, the build platform is 114 is lowered with deposition of each successive powder layer for the formation of a new layer of the three-dimensional article 130. The build platform 114 can be lowered using a servo motor including a gear, adjusting screws, or by another suitable means.

The energy beam 170 is directed over the work plate 116 to fuse at least a portion of the first powder layer at selected locations to form a first cross-section of the three-dimensional article. More particularly, the energy beam melts the powder at the selected locations to fuse particles together to form the first cross-section of the three-dimensional article, such as according to a model generated by a CAD (Computer Aided Design) tool.

After the first layer is finished, the build platform 114 is lowered from the initial position and a second powder layer is provided on the work plate 116. In embodiments, the second powder layer is distributed in the same manner as the previous powder layer, although alternative methods may be employed depending on the particular additive manufacturing apparatus. For example, a first layer may be deposited by a first powder distributor and a second layer may be deposited by a second powder distributor. The energy beam 170 is then directed over the work plate 116 to fuse the second powder layer in selected locations to form a second cross-section of the three-dimensional article 130. In addition to fusing the powder to other powder particles in the second powder layer, in embodiments, fused portions in the second layer are bonded to fused portions in the first layer. For example, the fused portions in adjacent powder layers may be melted together by melting not only the powder layer in the uppermost layer, but also remelting at least a portion of a thickness of the layer directly below the uppermost layer.

In embodiments, when the energy beam 170 impinges on an energy beam target, such as the work plate 116 or the powder layer, it generates x-ray radiation 180 radiating in all backward directions, i.e., in a direction out of the top surface of the substrate into the vacuum chamber or ambient environment. The x-ray detector 160 receives a signal that has an intensity corresponding to the intensity of the x-ray radiation 180. Commercially available x-ray detectors suitable for use include those available under the tradename xQam™ from Arcam AB. In various embodiments, the intensity of the x-ray signal is used to detect a position of the energy beam 170.

Figure 2:
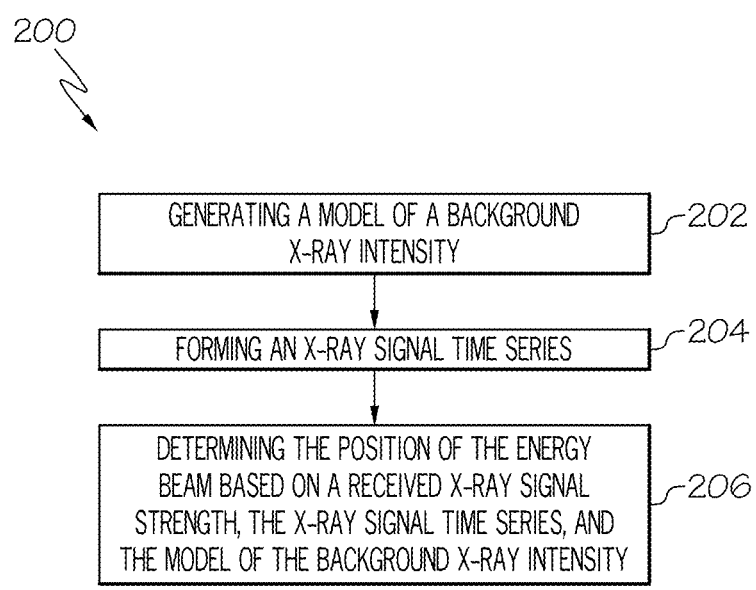
FIG. 2 is a block diagram of an example method for determining a position of an energy beam in accordance with one or more embodiments shown and described herein.

FIG. 2 is a block diagram of an example method 200 for detecting a position of an energy beam according to various embodiments. Method 200 generally includes generating a model of a background x-ray intensity (block 202), forming an x-ray signal time series (block 204), and determining the position of the energy beam based on a received x-ray signal strength, the x-ray signal time series, and the model of the background x-ray intensity (block 206). Each of these steps will be now be described in greater detail.

As shown in FIG. 2, the method 200 begins with generating a model of a background x-ray intensity (block 202). In various embodiments, the model is generated by mapping a first intensity modulated x-ray signal with a plurality of locations on an energy beam target with a computing device, such as control unit 150. For example, in embodiments, the energy beam is scanned at a constant beam current in a first direction on along the energy beam target to generate x-ray radiation (e.g., x-rays) that is received by the x-ray detector. The x-ray radiation generated by the energy beam at each location on the energy beam target as the energy beam is scanned has a corresponding x-ray signal intensity, and the x-ray detector generates an intensity modulated x-ray signal based on the received x-rays. In embodiments, the control unit maps the intensity modulated x-ray signal with the plurality of locations, such that each location within the scanning area has a corresponding x-ray signal intensity. An example of a map is shown in FIG. 3.

Figure 3:
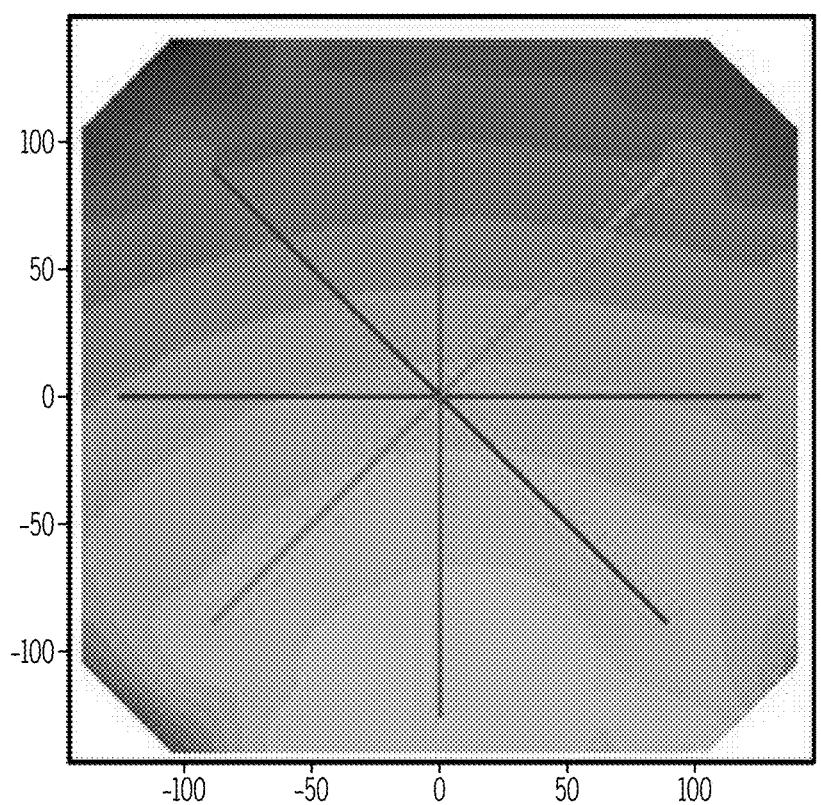
FIG. 3 is an example map of x-ray signal strength as a function of distance from the x-ray detector in accordance with one or more embodiments shown and described herein.

As shown in FIG. 3, the intensity (or magnitude) of the signal is highest directly below the x-ray detector, and the intensity decreases quadratically as the location at which the energy beam contacts the energy beam target moves away from the x-ray detector. A specific model representing a predicted intensity as a function of distance from the x-ray detector may be fit to the experimental data using numerical-analysis software, such as may be present on the control unit 150 or another computing device. Variations in the intensity of the signal are constant given the same beam current, beam position, target chemistry, and target geometry. Accordingly, in embodiments, when the energy beam is scanned at a constant energy beam current, the recorded number of x-rays that reach the x-ray detector varies based on the location of the strike of the energy beam on the energy beam target, provided that the energy beam target is homogenous across its area. Moreover, it is noted that the variations do not depend on the speed at which the energy beam is scanned and, as such, the model may be generated by scanning the energy beam at a scanning speed that is lower than a scanning speed of the energy beam when the additive manufacturing device is in operation and used at a relatively high scanning speed.

Returning to FIG. 2, the method 200 continues with forming an x-ray signal time series (block 204). In embodiments, the x-ray signal time series is formed by scanning the energy beam along the energy beam target along straight lines at increasing speed to generate a plurality of intensity modulated x-ray signals, with each intensity modulated x-ray signal corresponding to the scanning in a corresponding direction at a corresponding speed. In embodiments, the energy beam is scanned in a first direction along the energy beam target at a first speed to generate x-ray radiation (e.g., x-rays) that is received by the x-ray detector. The x-ray radiation generated by the energy beam at each location on the energy beam target as the energy beam is scanned has a corresponding x-ray signal intensity, and the x-ray detector generates an intensity modulated x-ray signal based on the received x-rays. The control unit 150 generates, for each speed, a time series for the x-ray signal which correlates the received signal intensity with the time. Then, the energy beam is scanned at a new speed and a new time series is generated. This step is repeated a plurality of times.

Figure 4A:
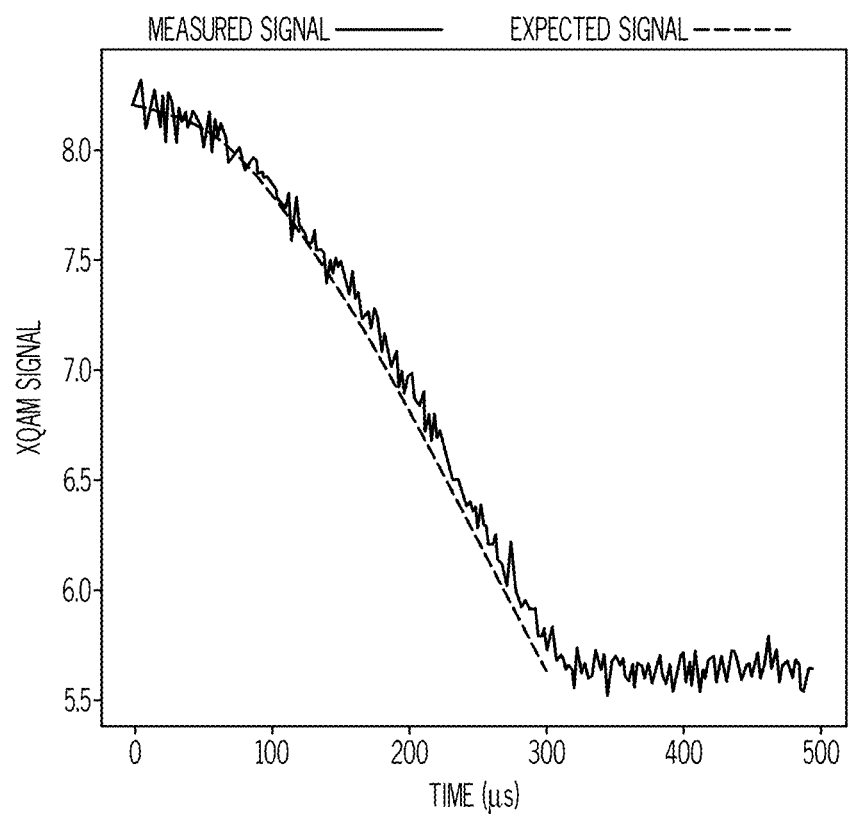
FIG. 4A is a plot of the x-ray signal (y-axis) as a function of time (x-axis; in µs) for an energy beam scanned at a scan speed of 0.8 km/s in accordance with one or more embodiments shown and described herein.
Figure 4B:
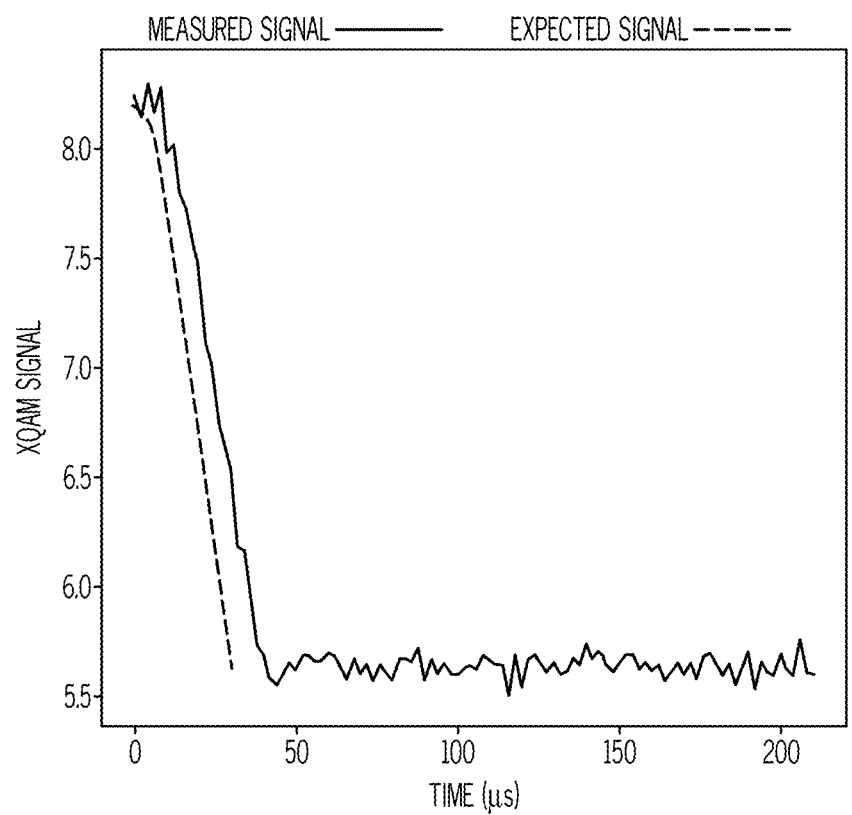
FIG. 4B is a plot of the x-ray signal (y-axis) as a function of time (x-axis; in µs) for an energy beam scanned at a scan speed of 8 km/s in accordance with one or more embodiments shown and described herein.

FIG. 4A and FIG. 4B depict two plots of an x-ray signal time series. In particular, FIG. 4A depicts an example plot of the x-ray signal intensity (y-axis) as a function of time (x-axis, in µs) at a scan speed of 0.8 km/s. FIG. 4B depicts an example plot of the x-ray signal intensity (y-axis) as a function of time (x-axis, in µs) at a scan speed of 8 km/s. As shown in FIGS. 4A and 4B, a model for each speed can be obtained.

Next, at block 206, the position of the energy beam is determined based upon a received x-ray signal strength using the x-ray signal time series and the model of the background x-ray intensity. For example, during operation, the received x-ray signal intensity can be compared to the x-ray signal time series for the corresponding speed at which the energy beam is being operated, and a time (s) corresponding to that x-ray signal can be obtained. Then, by multiplying the speed (m/s) by the time (s), a position, in distance from the x-ray detector, is obtained. By comparing the distance from the x-ray detector to the background x-ray intensity model, the location of the energy beam is obtained.

In embodiments, the location of the energy beam obtained by the method 200 is a position of the energy beam along a predetermined axis. For example, in embodiments, the x-ray detector is located at a position that is off-center with respect to a central axis of the energy beam target, as shown in FIG. 5.

Figure 5:
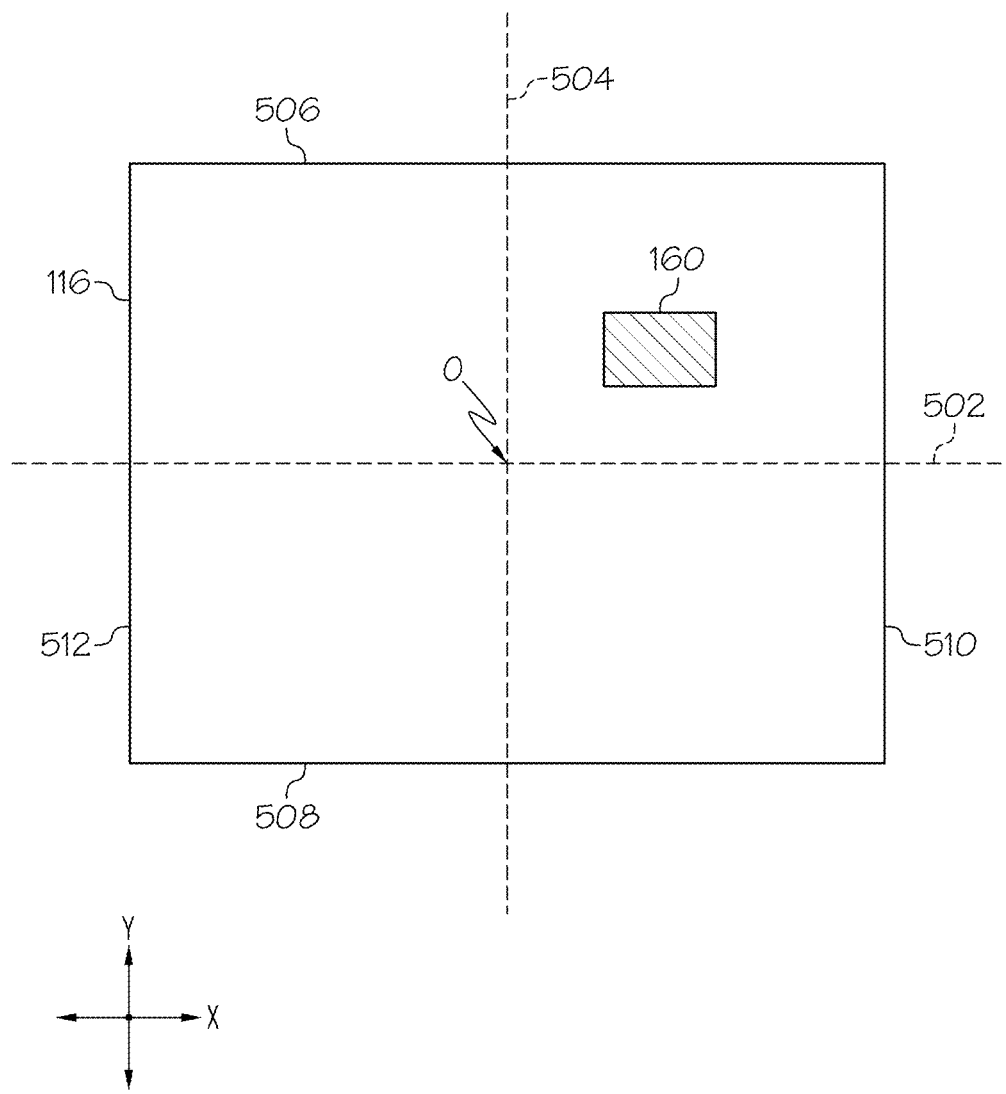
FIG. 5 schematically depicts an overhead view of an x-ray detector positioned over a work plate bisected by a central x-axis and a central y-axis in accordance with one or more embodiments shown and described herein.

FIG. 5 depicts an overhead view of the work plate 116 of FIG. 1. The x-ray detector 160 is also shown in FIG. 5. The work plate 116 is bisected by a central x-axis 502 and by a central y-axis 504, which intersect at point O in the geometric center of the work plate 116. The central x-axis 502 is located at a position that is equidistant between a first edge 506 of the work plate 116 and a second edge 508 of the work plate 116 opposing the first edge 506 of the work plate 116. The central y-axis 504 is located at a position that is equidistant between a third edge 510 of the work plate 116 and a fourth edge 512 of the work plate 116 opposing the third edge 510 of the work plate 116. The third edge 510 and the fourth edge 512 of the work plate 116 extend from the first edge 506 to the second edge 508. Although the work plate 116 is depicted in FIG. 5 as having four edges, with each edge intersecting adjacent edges at right angles, other shapes of the work plate 116 are contemplated. Methods of determining the geometric center of such shapes are known to those skilled in the art.

As shown in FIG. 5, in embodiments, the x-ray detector 160 is located at a position that is closer to the first edge 506 than the second edge 508 and closer to the third edge 510 than the fourth edge 512 of the work plate 116. In other words, in embodiments, the x-ray detector 160 is located at a position that is not the geometric center of the energy beam target. Such an arrangement enables the position of the energy beam to be estimated with greater certainty. For example, in embodiments in which the x-ray detector 160 is positioned off-axis, the modulated signal can indicate a difference in position as the energy beam is scanned in a direction perpendicular to the axis. Therefore, the energy beam may be scanned along a predetermined axis and the position of the energy beam can be identified as two possible positions along the predetermined axis, based on the distance of the energy beam from the x-ray detector. Additional information about the position of the energy beam, such as information received from additional x-ray detectors at a different location over the work plate 116 can be used to increase the certainty with which the position of the energy beam is determined. For example, information from multiple x-ray detectors can be used to triangulate the position of the energy beam.

In various embodiments described herein, the position of the energy beam can be determined as being along a radius from the x-ray detector 160, as being along a particular axis with respect to the x-ray detector 160, as being two potential positions (e.g., point) on the energy beam target, or as being a single point on the energy beam target.

In embodiments, the time series and the model of background intensity is used to determine a variance of a position or a speed of the energy beam from a target position or predetermined speed of the energy beam, respectively. In such embodiments, the energy beam is scanned at a predetermined speed, and the intensity modulated x-ray signal is received by the x-ray detector. The control unit 150 compares the received intensity modulated x-ray signal to the corresponding time series for the predetermined speed and, based on the comparison, determines a difference between the received intensity modulated x-ray signal and the expected intensity modulated x-ray signal. When the difference between the received intensity modulated x-ray signal and the expected intensity modulated x-ray signal exceeds a predetermined threshold, the control unit 150 provides an output. The output can be, by way of example and not limitation, a warning or alert, a power reduction, a power increase, or a change in one or more beam parameters. For example, if the received intensity modulated x-ray signal differs from the expected intensity modulated x-ray signal for a particular scanning speed by greater than or equal to 5%, 10%, or 20%, the control unit 150 may set the scanning speed as a maximum energy beam speed.

In embodiments, instead of comparing the received intensity modulated x-ray signal to an expected intensity modulated x-ray signal, the received intensity modulated x-ray signal can be used to estimate a position and compare the estimated position of the energy beam to a target position. For example, an estimated position of the energy beam can be determined based on the received intensity modulated x-ray signal, the time series, and the model of the background x-ray intensity. The estimated position of the energy beam can be compared to a target position of the energy beam, which corresponds to a particular x-ray signal intensity to determine a difference between the estimated position and the target position. In embodiments, the difference is compared to a threshold difference and, if the difference between the estimated position and the target position exceeds the threshold difference, the control unit 150 generates an output. For example, the output can be an alert or warning, or the output can be an adjustment to one or more energy beam parameters or a parameter of the beam control unit. Adjustment to one or more energy beam parameters or a parameter of the beam control unit can be made, for example, to correct the position of the energy beam or to otherwise account for the variance in position.

In embodiments, the model of the background x-ray intensity, the time series, and the information contained therein can be used in combination with one or more additional pieces of information regarding the position, speed, or path of the energy beam. For example, in embodiments, an imaging device, such as a camera, captures an image with a long exposure time (e.g., greater than or equal to 1 ms or greater than or equal to 1 second) that can be used to estimate the position of the energy beam as a function of time. In particular, an image with along exposure time of a fast moving energy beam results in a bright line showing where the energy beam was during the exposure. However, the image lacks information on when during the exposure the energy beam was at a given point in the image. However, by comparing the radial distance as a function of time (based on the x-ray signal) with the bright line in the image, the position as a function of time can be estimated.

Figure 6A:
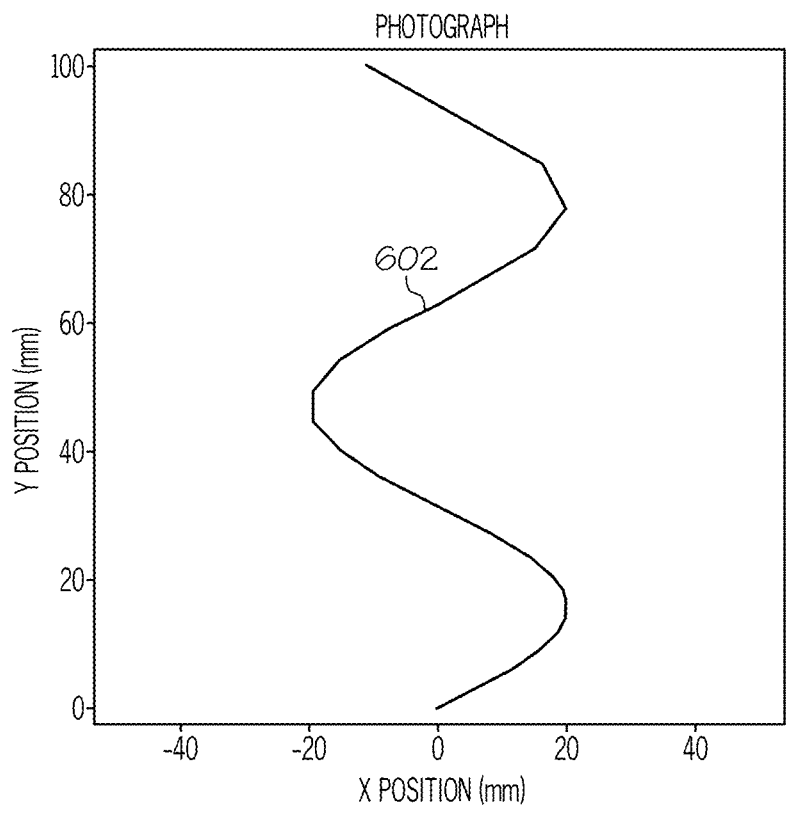
FIG. 6A is a plot of the position of an energy beam moving away from an x-ray detector located at (x,y) position (0,0) obtained from a photograph of the work plate in accordance with one or more embodiments shown and described herein.
Figure 6B:
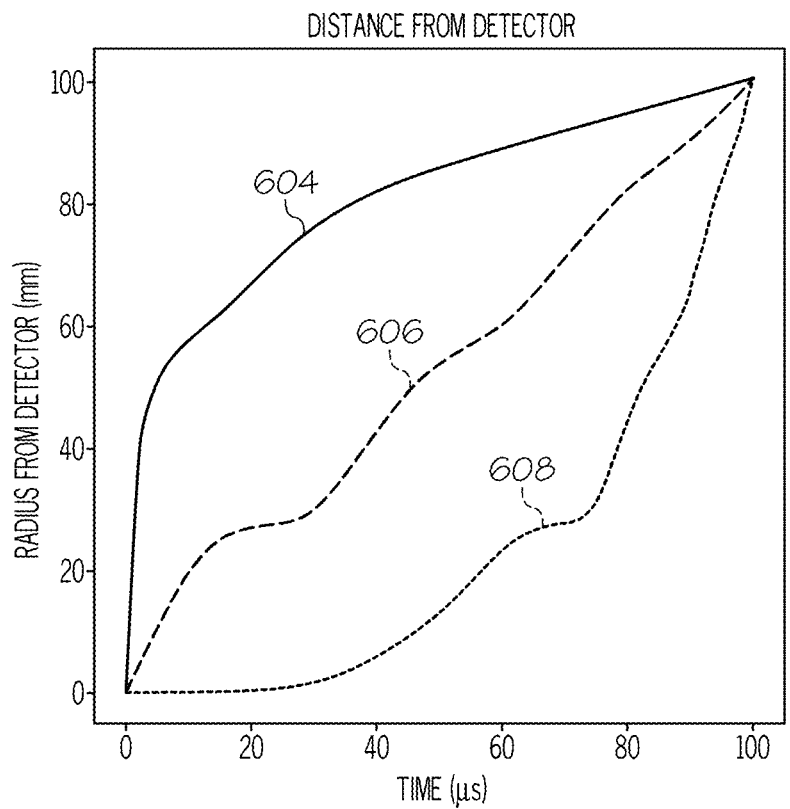
FIG. 6B is a plot of the estimated radius from the x-ray detector (y-axis; in mm) as a function of time (x-axis; in µs) in accordance with one or more embodiments shown and described herein.

FIG. 6A represents a plot 602 of the position of an energy beam moving away from an x-ray detector located at (x,y) position (0,0). Such a plot can be obtained, for example, by processing a photograph taken of the work plate with a long exposure while the energy beam is scanned. Such processing can, for example, correlate the position of the energy beam with the x-y grid, and may be performed using a computing device and associated software. FIG. 6B is a plot of the estimated radius from the x-ray detector (y-axis; in mm) as a function of time (x-axis; in µs) for three different experiments, where plot 604 corresponds to the first experiment, plot 606 corresponds to the second experiment, and plot 608 corresponds to the third experiment. In each experiment, the energy beam is moved along the path shown in plot 602 in FIG. 6A, but the speed of the energy beam is different for each experiment. More particularly, in the first experiment, the energy beam moves fast in the beginning and slow in the end, in the second experiment, the energy beam is scanned at a constant speed, and in the third experiment, the energy beam is scanned slowly at the beginning and increases in speed towards the end. Accordingly, by combining the path shown in plot 602 with the distance measurement enables estimation of the position of the energy beam (and not just the distance) as a function of time.

Although the use of an image is described, it is contemplated that additional hardware could be used to obtain similar information to enable estimation of the position of the energy beam. For example, in embodiments, two or more x-ray detectors may be incorporated in the additive manufacturing apparatus. The information obtained from each of the x-ray detectors can be combined to estimate the position of the energy beam. In particular, each of the x-ray detectors can provide information enabling determination of the energy beam along an axis. The information can be combined, such as by overlapping maps based on the information received from both x-ray detector, and the point at which the maps intersect is indicative of the location of the energy beam.

In various embodiments, a program element is configured and arranged, when executed on a computer, for detecting a position of an energy beam. The program element may specifically be configured to perform the steps of: mapping a first energy intensity modulated x-ray signal with a plurality of locations on an energy beam target, thereby generating a model of a background x-ray intensity; forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and determining the position of the energy beam based upon a received x-ray signal strength based on the x-ray signal time series and the model of the background x-ray intensity.

The program element may be installed in a computer readable storage medium. The computer readable storage medium may be the control unit 150 or another distinct and separate control unit, depending on the particular embodiment. The computer readable storage medium and the program element, which may comprise computer-readable program code portions embodied therein, may further be contained within a non-transitory computer program product.

It is contemplated that various embodiments described herein may be implemented in one or more of a variety of ways, including as non-transitory computer program products. A computer program product may include a non-transitory computer-readable storage medium storing applications, programs, program modules, scripts, source code, program code, object code, byte code, compiled code, interpreted code, machine code, executable instructions, and the like, which are referred to herein as "executable instructions," "instructions for execution," and/or "program code." Such non-transitory computer-readable storage media include all computer-readable media, including volatile and non-volatile media.

In embodiments, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium. A non-volatile computer-readable storage medium may also include a punch card, paper tape, optical mark sheet (or any other physical medium with patters of holes or other optically recognizable indicia), compact disc read only memory (CD-ROM), compact disc-rewritable (CD-RW), digital versatile disc (DVD), Blu-ray disc (BD), other non-transitory optical medium, or the like. Such a non-volatile computer-readable storage medium may include read-only memory (ROM), programmable read-only memory (PROM), erasable programmable read-only memory (EPROM), electrically erasable programmable read-only memory (EEPROM), flash memory (e.g., Serial, NAND, NOR, or the like), multimedia memory cards, secure digital (SD) memory cards, SmartMedia cards, CompactFlash (CF) cards, memory sticks, or the like. In embodiments, a non-volatile computer-readable storage medium may include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), silicon-oxide-nitride-oxide-silicon memory (SONOS), floating junction gate random access memory (FJG RAM), Millipede memory, racetrack memory, or the like.

In embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), rambus dynamic random access memory (RDRAM) twin transistor RAM (TTRAM), thyristor RAM (T-RAM), zero-capacitor (Z-RAM), Rambus in-line memory module (RIMM), dual in-line memory module (DIMM), single in-line memory module (SIMM), video random access memory (VRAM), cache memory, flash memory, register memory, or the like. It will be appreciated that where embodiments are described herein as using a computer-readable storage medium, other types of computer-readable storage media may be substituted for or used in addition to the computer-readable storage media described herein.

Various embodiments described herein may be implemented as methods, apparatus, systems, computing device, computing entities, or the like, as have been described elsewhere herein. As such, embodiments described herein may take the form of an apparatus, system, computing device, computing entity, or the like executing instructions stored on a computer-readable storage medium to perform certain steps or operations. However, embodiments may also take the form of an entirely hardware embodiment performing certain steps or operations.

Moreover, various embodiments are described herein with reference to block diagrams and flowchart illustrations of apparatuses, methods, systems, and computer program products. It should be understood that each block of any of the block diagrams and flowchart illustrations may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions in the flowchart block or blocks.

The computer instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable apparatus to produce a computer-implemented process such that the instructions that execute on the computer or other programmable apparatus provide operations for implementing the functions specified in the flowchart block or blocks.

Figure 7:
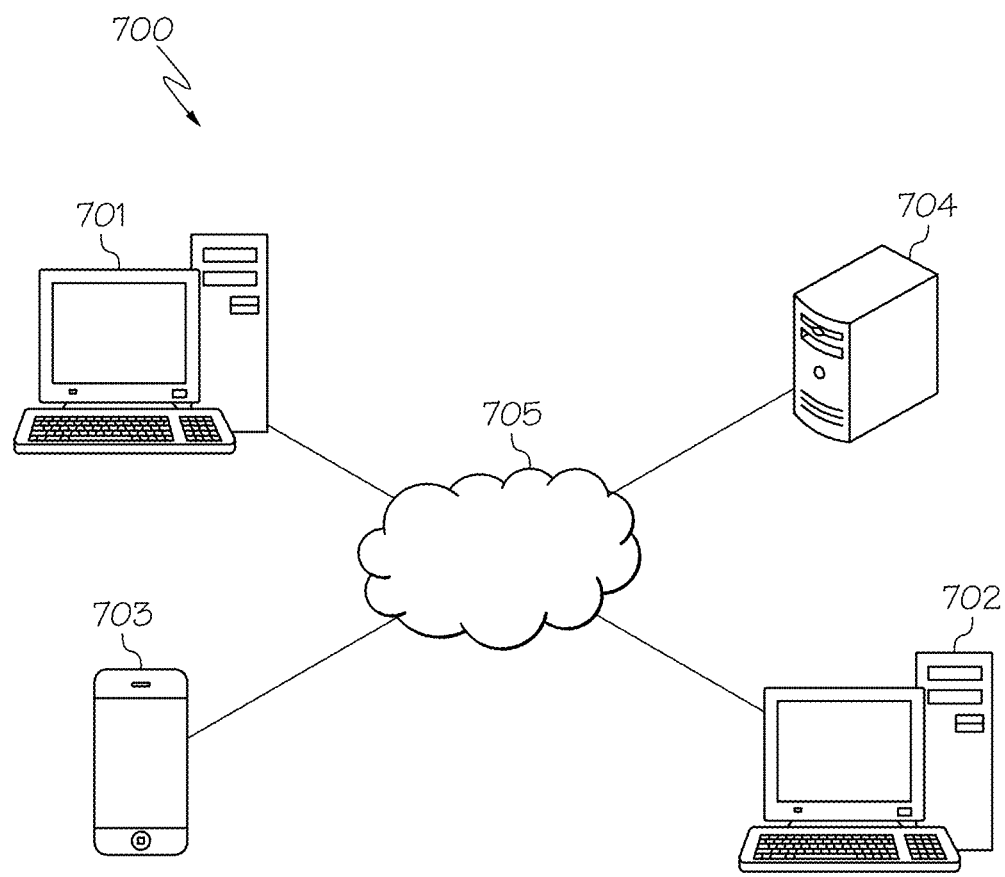
FIG. 7 is a block diagram of an example system for use in accordance with one or more embodiments shown and described herein.

FIG. 7 is a block diagram of an exemplary system 700 that can be used in conjunction with various embodiments described herein. As shown in FIG. 7, the system 700 includes one or more central computing devices 701, one or more distributed computing devices 702, and one or more distributed handheld or mobile devices 703, all configured in communication with a central server 704 (or control unit) via one or more networks 705. In embodiments, the control unit 150 described hereinabove may take the form of any one or more of the devices 701, 702, or 703 or the server 704 within the system 700. While FIG. 7 illustrates the various system entities as separate, standalone entities, the various embodiments are not limited to this particular architecture.

According to embodiments, the one or more networks 705 are capable of supporting communication in accordance with any one or more of a number of second-generation (2G), 2.5G, third-generation (3G), fourth-generation (4G), and/or fifth generation (5G) mobile communication protocols or the like. More particularly, the one or more networks 705 may be capable of supporting communication in accordance with 2G wireless communication protocols IS-136 (TDMA), GSM, and IS-95 (CDMA). Also, for example, the one or more networks 705 may be capable of supporting communication in accordance with 2.5 wireless communication protocols GPRS, enhanced data GSM environment (EDGE), or the like. In embodiments, the one or more networks 705 are capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also be employed, as may dual or higher mode mobile stations (e.g., digital/analog or TDMA/CDMA/analog phones). In embodiments, the one or more networks 705 may communicate using techniques such as, for example, radio frequency (RF), Bluetooth™ infrared (IrDA), or any of a number of different wired or wireless networking techniques, including a wired or wireless personal area network (PAN), local area network (LAN), metropolitan area network (MAN), wide area network (WAN), or the like.

Although the devices 701, 702, 703, and 704 are illustrated in FIG. 7 as communicating with one another over the same network 705, these devices may additionally or alternatively communicate over multiple, separate networks.

In embodiments, in addition to receiving data from the server 704, the devices 701, 702, and 703 may be further configured to collect and transmit data on their own. In embodiments, the devices 701, 702, and 703 may be capable of receiving data via one or more input units or devices, such as a keypad, touchpad, barcode scanner, radio frequency identification (RFID) reader, interface card (e.g., modem, etc.) or receiver. The devices 701, 702, and 703 may further be capable of storing data to one or more volatile or non-volatile memory modules, and outputting the data via one or more output units or devices, for example, by displaying data to the user operating the device, or by transmitting data, for example, over the one or more networks 705.

In various embodiments, the server 704 includes various systems for performing one or more functions in accordance with various embodiments of the present disclosure, including those more particularly shown and described herein. It should be understood, however, that the server 704 might include a variety of alternative devices for performing one or more like functions. For example, at least a portion of the server 704, in embodiments, may be located on the devices 701, 702, or 703. As will be described in further detail below, in embodiments, the mobile device 703 may contain one or more mobile applications 706, which may be configured so as to provide a user interface for communication with the server 704, such as to control one or more functions of the additive manufacturing apparatus described hereinabove.

Figure 8:
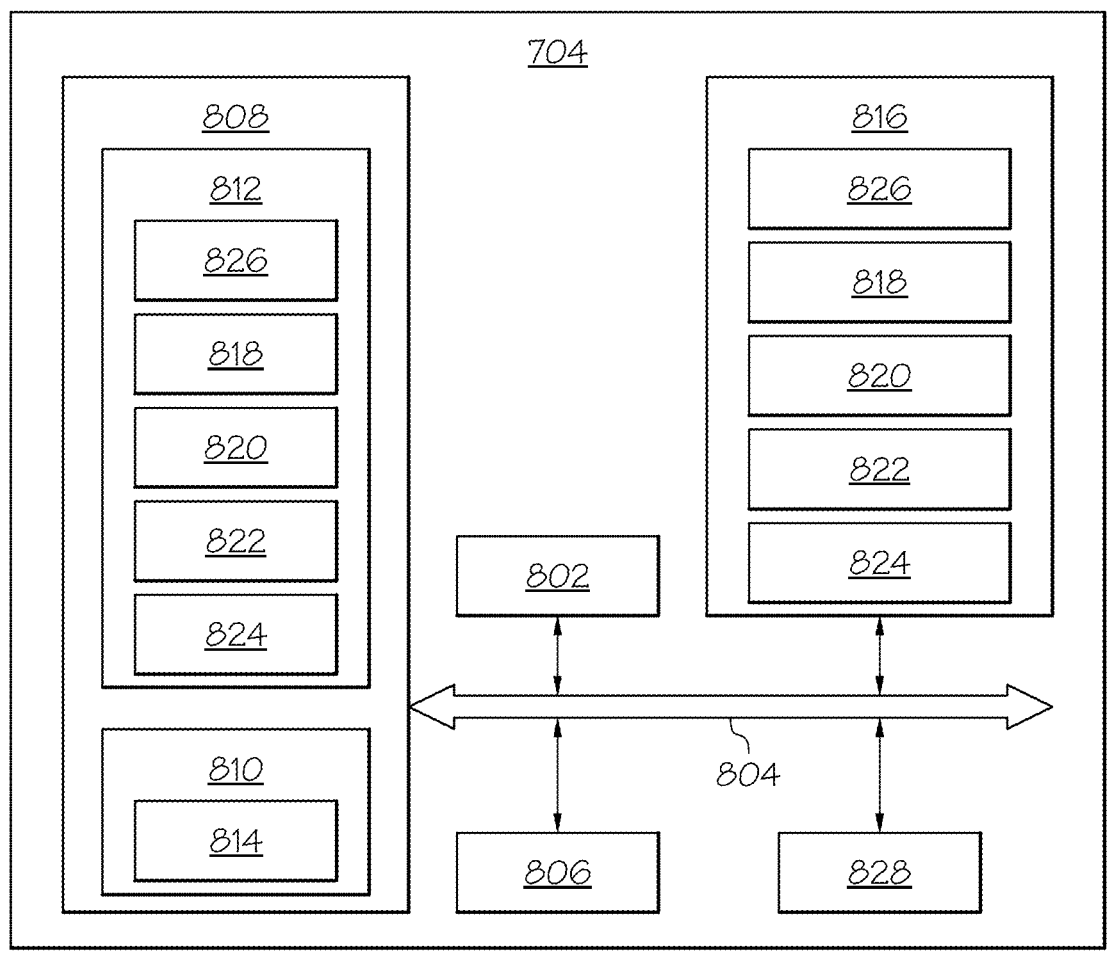
FIG. 8 is a schematic block diagram of an example server for use in accordance with one or more embodiments shown and described herein.

FIG. 8 is a schematic diagram of the server 704 according to various embodiments. The server 704 includes a processor 802 that communicates with other elements within the server via a system interface or bus 804. Also included in the server 704 is a display/input device 806 for receiving and displaying data. The display/input device 806 may be, for example, a keyboard or pointing device that is used in combination with a monitor, or maybe a touch screen in which the input functionality is incorporated directly into the display. The server 704 further includes memory 808, which typically includes both read only memory (ROM) 810 and random access memory (RAM) 812. The server's ROM 810 is used to store a basic input/output system (BIOS) 814, containing the basic routines that help to transfer information between elements within the server 704. Various ROM and RAM configurations have been described herein.

In addition, the server 704 includes at least one storage device or program storage 816, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 816 are connected to the bus 804 by an appropriate interface. The storage devices 816 and their associated computer-readable media provide nonvolatile storage for a personal computer. As will be appreciated by one of ordinary skill in the art, the computer-readable media described could be replaced by any other type of computer-readable media known in the art, including, as non-limiting examples, magnetic cassettes, flash memory cards, digital video disks, and Bernoulli cartridges.

Although not shown in the figures, in embodiments, the storage device 816 and/or memory of the server 704 may further provide the functions of a data storage device, which may store historical and/or current delivery data and delivery conditions that may be accessed by the server 704. In this regard, the storage device 816 may comprise one or more databases. The term "database" refers to a structured collection of records or data that is stored in a computer system, such as via a relational database, hierarchical database, or network database. Databases may store, for example, data regarding x-ray signal intensity, energy beam position, or energy beam operational parameters.

A number of program modules (e.g., modules 818, 820, 822, and 824) comprising, for example, one or more computer-readable code portions executable by the processor 802, may be stored by the various storage devices 816 and within RAM 812. Such program modules may also include an operating system 826. In these and other embodiments, modules 818, 820, 822, and 824 control certain aspects of the operation of the server 704 with the assistance of the processor 802 and operating system 826. In embodiments, it should be understood that one or more additional or alternative modules may be provided.

In various embodiments, the modules 818, 820, 822, and 824 are executed by the processor 802 of the server 704 and are configured to generate one or more graphical user interfaces, reports, instructions, and/or notifications or alerts, all accessible and/or transmittable to various users of the system 700. In embodiments, the user interfaces, reports, instructions, and/or notifications or alerts may be accessible via the one or more networks 705, which may include the internet or other feasible communications network, as previously described.

In embodiments, it should further be understood that one or more of the modules 818, 820, 822 and 824 may alternatively or additionally (e.g., in duplicate) be stored locally on one or more of the devices 701, 702, and 703 and may be executed by one or more processors of the same (not shown). According to various embodiments, the modules 818, 820, 822, and 824 may send data to, receive data from, and utilize data contained in one or more databases, which may be comprised of one or more separate, linked, and/or networked databases. For example, the modules 818, 820, 822, and 824 may receive data one or more databases and utilize the data to determine a position of an energy beam at a particular time in accordance with various embodiments described herein.

Also located within the server 704 is a network interface 828 for interfacing and communicating with other elements of the one or more networks 705. It will be appreciated by one of ordinary skill in the art that one or more of the components of the server 704 may be located geographically remotely from other server components. Furthermore, one or more of the components of the server 704 may be combined, and/or additional components performing functions described herein may also be included in the server 704.

While the foregoing describes a single processor 802, in embodiments, the server 704 may include multiple processors operating in conjunction with one another to perform one or more functions described herein. In addition to the memory 808, the processor 802 can also be connected to (e.g., communicatively coupled to) at least one interface or other means for displaying, transmitting, and/or receiving data, content, or the like. In this regard, the interface(s) can include at least one communication interface or other means for transmitting and/or receiving data, content, or the like, as well as at least one user interface that can include a display and/or a user input interface. The user interface, in turn, can comprise any of a number of input devices enabling the computing device to receive data from a user, such as a keypad, a touch display, a joystick, or other input device.

Still further, while reference is made to the server 704, embodiments described herein are not limited to traditionally defined server architectures. Moreover, the system of various embodiments is not limited to a single server, or similar network entity or mainframe computer system. Other similar architectures including one or more network entities operating in conjunction with one another to provide the functionality described herein may likewise be used in embodiments. For example, a mesh network of two or more personal computers (PCs), similar electronic devices, or handheld portable devices, collaborating with one another to provide the functionality described herein in association with the server 704.

According to embodiments, individual steps of a process may or may not be carried out utilizing the computer systems and/or servers described herein, and the degree of computer implementation may vary, depending on the particular application.

Various embodiments described herein enable the dynamic behavior of an energy beam to be quantified. The quantification of such dynamics can be used, for example, to verify the performance of the additive manufacturing device, such as to confirm that the energy beam is moving at the desired speed and to detect changes in system performance. In various embodiments, deviation of the determined speed and/or position of the energy beam from the predicted or target speed and/or position of the energy beam can indicate a possible system error, such as a partial or complete failure of one or more parts of the energy beam scanning system or the like. Moreover, it is contemplated that various embodiments described herein can be implemented during the manufacture of a three-dimensional article. Accordingly, various embodiments can enable determination and adjustment of a system issue during the manufacture of a three-dimensional article, thereby improving part quality and reducing inefficiencies and waste.

Further aspects of the invention are provided by the subject matter of the following clauses:

1. A method for detecting a position of an energy beam, the method comprising: mapping, using a computing device, a first intensity modulated x-ray signal with a plurality of locations on an energy beam target, thereby generating a model of a background x-ray intensity; forming, using the computing device, an x-ray signal time series using subsequent intensity modulated x-ray signals, each of the subsequent intensity modulated x-ray signals resulting from scanning an energy beam along the energy beam target in one of a plurality of directions at one of a plurality of speeds; and determining, using the computing device, the position of the energy beam based upon a received x-ray signal strength based on the x-ray signal time series and the model of the background x-ray intensity.

2. The method according to any preceding clause, wherein each of the x-ray signals is received by an x-ray detector located at a position that is closer to a first edge of the energy beam target than a second edge of the energy beam target opposing the first edge of the energy beam target and closer to a third edge of the energy beam target than a fourth edge of the energy beam target opposing the third edge of the energy beam target, wherein the third edge and the fourth edge extend from the first edge to the second edge of the energy beam target.

3. The method according to any preceding clause, wherein determining the position of the energy beam comprises determining the position of the energy beam along a predetermined axis.

4. The method according to any preceding clause, wherein determining the position of the energy beam comprises identifying two possible positions of the energy beam along the predetermined axis.

5. The method according to any preceding clause, wherein the model of the background x-ray intensity is based on a quadratic equation.

6. The method according to any preceding clause, further comprising: determining, using the computing device, that the position of the energy beam differs from a target position by an amount greater than a threshold amount; and setting a maximum energy beam speed responsive to determining that the position of the energy beam differs from the target position by the amount greater than the threshold amount.

7. The method according to any preceding clause, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

8. The method according to any preceding clause, wherein determining the position of the energy beam comprises determining the position of the energy beam along a predetermined axis.

9. The method according to any preceding clause, wherein determining the position of the energy beam comprises identifying two possible positions of the energy beam along the predetermined axis.

10. The method according to any preceding clause, wherein the model of the x-ray background intensity and the x-ray signal time series corresponds to a first x-ray detector, the method further comprising: mapping, using the computing device, the first intensity modulated x-ray signal received by a second x-ray detector with a plurality of locations on an energy beam target, thereby generating a model of a background x-ray intensity corresponding to the second x-ray detector; and forming, using the computing device, an x-ray signal time series corresponding to the second x-ray detector using subsequent intensity modulated x-ray signals received by the second x-ray detector.

11. The method according to any preceding clause, wherein determining the position of the energy beam comprises identifying a position of the energy beam in at least two dimensions.

12. The method according to any preceding clause, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

13. The method according to claim 1, further comprising: scanning an energy beam in at least a first direction on the energy beam target for generating x-rays to be received by at least one x-ray detector; receiving the generated x-rays with the at least one x-ray detector; and generating, using the computing device, the first intensity modulated x-ray signal based on the generated x-rays received by the at least one x-ray detector.

14. A program element configured and arranged when executed on a computer to implement a method for detecting a position of an energy beam, the method comprising the steps of: mapping a first intensity modulated x-ray signal with a plurality of locations on an energy beam target, thereby generating a model of a background x-ray intensity; forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and determining the position of the energy beam based upon a received x-ray signal strength based on the x-ray signal time series and the model of the background x-ray intensity.

15. The program element according to any preceding clause, the method further comprising: determining that the position of the energy beam differs from a target position by an amount greater than a threshold amount; and setting a maximum energy beam speed responsive to determining that the position of the energy beam differs from the target position by the amount greater than the threshold amount.

16. The program element according to any preceding clause, the method further comprising: scanning an energy beam in at least a first direction on the energy beam target for generating x-rays to be received by at least one x-ray detector; receiving the generated x-rays with the at least one x-ray detector; and generating the first intensity modulated x-ray signal based on the generated x-rays received by the at least one x-ray detector.

17. A computer readable medium having stored thereon the program element according to any preceding clause.

18. A non-transitory computer program product comprising at least one computer-readable storage medium having computer-readable program code portions embodied thereon, the computer-readable program code portions comprising: an executable portion configured for mapping a first intensity modulated x-ray signal with a plurality of locations on an energy beam target, thereby generating a model of a background x-ray intensity; an executable portion configured for forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and an executable portion configured for determining the position of the energy beam based upon a received x-ray signal strength based on the x-ray signal time series and the model of the background x-ray intensity.

19. The non-transitory computer program product according to any preceding clause, wherein the computer-readable program code portions further comprise: an executable portion configured for determining that the position of the energy beam differs from a target position by an amount greater than a threshold amount; and an executable portion configured for setting a maximum energy beam speed responsive to determining that the position of the energy beam differs from the target position by the amount greater than the threshold amount.

20. The non-transitory computer program product according to any preceding clause, wherein the computer-readable program code portions further comprise: an executable portion configured for scanning an energy beam in at least a first direction on the energy beam target for generating x-rays to be received by at least one x-ray detector; an executable portion configured for receiving the generated x-rays with the at least one x-ray detector; and an executable portion configured for generating the first intensity modulated x-ray signal based on the generated x-rays received by the at least one x-ray detector.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

What is claimed is:

1. A method for detecting a position of an energy beam, the method comprising:
mapping, using a computing device, a first intensity modulated x-ray signal with a plurality of locations on an energy beam target, thereby generating a model of a background x-ray intensity;
forming, using the computing device, an x-ray signal time series using subsequent intensity modulated x-ray signals, each of the subsequent intensity modulated x-ray signals resulting from scanning an energy beam along the energy beam target in one of a plurality of directions at one of a plurality of speeds; and
determining, using the computing device, the position of the energy beam based upon a received x-ray signal strength based on the x-ray signal time series and the model of the background x-ray intensity;
wherein each of the x-ray signals is received by an x-ray detector located at a position that is closer to a first edge of the energy beam target than a second edge of the energy beam target opposing the first edge of the energy beam target and closer to a third edge of the energy beam target than a fourth edge of the energy beam target opposing the third edge of the energy beam target, wherein the third edge and the fourth edge extend from the first edge to the second edge of the energy beam target.

2. The method according to claim 1, wherein determining the position of the energy beam comprises determining the position of the energy beam along a predetermined axis.

3. The method according to claim 2, wherein determining the position of the energy beam comprises identifying two possible positions of the energy beam along the predetermined axis.

4. The method according to claim 1, wherein the model of the background x-ray intensity is based on a quadratic equation.

5. The method according to claim 1, further comprising:
determining, using the computing device, that the position of the energy beam differs from a target position by an amount greater than a threshold amount; and
setting a maximum energy beam speed responsive to determining that the position of the energy beam differs from the target position by the amount greater than the threshold amount.

6. The method according to claim 5, further comprising:
scanning an energy beam in at least a first direction on the energy beam target for generating x-rays to be received by at least one x-ray detector;
receiving the generated x-rays with the at least one x-ray detector; and
generating, using the computing device, the first intensity modulated x-ray signal based on the generated x-rays received by the at least one x-ray detector.

7. The method according to claim 1, wherein determining the position of the energy beam comprises determining the position of the energy beam along a predetermined axis.

8. The method according to claim 7, wherein determining the position of the energy beam comprises identifying two possible positions of the energy beam along the predetermined axis.

9. The method according to claim 1, wherein the model of the x-ray background intensity and the x-ray signal time series corresponds to a first x-ray detector, the method further comprising:
mapping, using the computing device, the first intensity modulated x-ray signal received by a second x-ray detector with a plurality of locations on an energy beam target, thereby generating a model of a background x-ray intensity corresponding to the second x-ray detector; and
forming, using the computing device, an x-ray signal time series corresponding to the second x-ray detector using subsequent intensity modulated x-ray signals received by the second x-ray detector.

10. The method according to claim 9, wherein determining the position of the energy beam comprises identifying a position of the energy beam in at least two dimensions.

11. The method according to claim 9, further comprising:
scanning an energy beam in at least a first direction on the energy beam target for generating x-rays to be received by at least one x-ray detector;
receiving the generated x-rays with the at least one x-ray detector; and
generating, using the computing device, the first intensity modulated x-ray signal based on the generated x-rays received by the at least one x-ray detector.

12. The method according to claim 1, further comprising:
scanning an energy beam in at least a first direction on the energy beam target for generating x-rays to be received by at least one x-ray detector;
receiving the generated x-rays with the at least one x-ray detector; and
generating, using the computing device, the first intensity modulated x-ray signal based on the generated x-rays received by the at least one x-ray detector.

13. A non-transitory computer-readable medium having stored thereon a program element configured and arranged when executed on a computer to implement a method for detecting a position of an energy beam, the method comprising the steps of:
mapping a first intensity modulated x-ray signal with a plurality of locations on an energy beam target, thereby generating a model of a background x-ray intensity;
forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and
determining the position of the energy beam based upon a received x-ray signal strength based on the x-ray signal time series and the model of the background x-ray intensity;
wherein each of the x-ray signals is received by an x-ray detector located at a position that is closer to a first edge of the energy beam target than a second edge of the energy beam target opposing the first edge of the energy beam target and closer to a third edge of the energy beam target than a fourth edge of the energy beam target opposing the third edge of the energy beam target, wherein the third edge and the fourth edge extend from the first edge to the second edge of the energy beam target.

14. The program element according to claim 13, the method further comprising:

determining that the position of the energy beam differs from a target position by an amount greater than a threshold amount; and setting a maximum energy beam speed responsive to determining that the position of the energy beam differs from the target position by the amount greater than the threshold amount.

15. The program element according to claim 13, the method further comprising:

scanning an energy beam in at least a first direction on the energy beam target for generating x-rays to be received by at least one x-ray detector;

receiving the generated x-rays with the at least one x-ray detector; and generating the first intensity modulated x-ray signal based on the generated x-rays received by the at least one x-ray detector.

16. A computer readable medium having stored thereon the program element according to claim 13.

17. A non-transitory computer program product comprising at least one computer-readable storage medium having computer-readable program code portions embodied thereon, the computer-readable program code portions comprising:

an executable portion configured for mapping a first intensity modulated x-ray signal with a plurality of locations on an energy beam target, thereby generating a model of a background x-ray intensity;

an executable portion configured for forming an x-ray signal time series using subsequent intensity modulated x-ray signals, each of the subsequent intensity modulated x-ray signals resulting from scanning the energy beam along the energy beam target in one of a plurality of directions at one of a plurality of speeds; and an executable portion configured for determining the position of the energy beam based upon a received x-ray signal strength based on the x-ray signal time series and the model of the background x-ray intensity;

wherein each of the x-ray signals is received by an x-ray detector located at a position that is closer to a first edge of the energy beam target than a second edge of the energy beam target opposing the first edge of the energy beam target and closer to a third edge of the energy beam target than a fourth edge of the energy beam target opposing the third edge of the energy beam target, wherein the third edge and the fourth edge extend from the first edge to the second edge of the energy beam target.

18. The non-transitory computer program product according to claim 17, wherein the computer-readable program code portions further comprise:

an executable portion configured for determining that the position of the energy beam differs from a target position by an amount greater than a threshold amount; and an executable portion configured for setting a maximum energy beam speed responsive to determining that the position of the energy beam differs from the target position by the amount greater than the threshold amount.

19. The non-transitory computer program product according to claim 17, wherein the computer-readable program code portions further comprise:

an executable portion configured for scanning an energy beam in at least a first direction on the energy beam target for generating x-rays to be received by at least one x-ray detector;

an executable portion configured for receiving the generated x-rays with the at least one x-ray detector; and an executable portion configured for generating the first intensity modulated x-ray signal based on the generated x-rays received by the at least one x-ray detector.

* * * * *